(12) United States Patent
Karagozler et al.

(10) Patent No.: US 9,899,939 B2
(45) Date of Patent: Feb. 20, 2018

(54) HARVESTING ENERGY FROM INTERACTION WITH PAPERS

(71) Applicant: Disney Enterprises, Inc., Burbank, CA (US)

(72) Inventors: Mustafa Emre Karagozler, Pittsburgh, PA (US); Ivan Poupyrev, Pittsburgh, PA (US); Gary K. Fedder, Turtle Creek, PA (US)

(73) Assignee: Disney Enterprises, Inc., Burbank, CA (US)

( * ) Notice: Subject to any disclaimer, the term of this patent is extended or adjusted under 35 U.S.C. 154(b) by 894 days.

(21) Appl. No.: 14/146,517

(22) Filed: Jan. 2, 2014

(65) Prior Publication Data

US 2015/0097465 A1 Apr. 9, 2015

Related U.S. Application Data

(60) Provisional application No. 61/886,519, filed on Oct. 3, 2013.

(51) Int. Cl.
| | |
|---|---|
| *H02K 1/08* | (2006.01) |
| *H02N 1/08* | (2006.01) |
| *H02N 1/00* | (2006.01) |
| *G09B 5/06* | (2006.01) |
| *H02N 1/04* | (2006.01) |

(52) U.S. Cl.
CPC ............... *H02N 1/08* (2013.01); *H02N 1/00* (2013.01); *G09B 5/062* (2013.01); *H02N 1/002* (2013.01); *H02N 1/04* (2013.01)

(58) Field of Classification Search
CPC ............ H02N 1/00; H02N 1/002; H02N 1/04; H02N 1/10; G09B 5/062

USPC .................................. 310/300, 309, 310
See application file for complete search history.

(56) References Cited

U.S. PATENT DOCUMENTS

| | | | |
|---|---|---|---|
| 8,536,760 B1 * | 9/2013 | Kim, II ............... | H02N 11/002 310/309 |
| 2010/0066071 A1 * | 3/2010 | Kelaidis ................ | B42D 1/009 281/15.1 |
| 2011/0050181 A1 * | 3/2011 | Post ..................... | H02N 1/04 320/166 |
| 2011/0062820 A1 * | 3/2011 | Aoyagi ................. | H02N 1/08 310/300 |
| 2011/0109457 A1 * | 5/2011 | Maharshak ........... | A45C 1/06 340/568.7 |

(Continued)

OTHER PUBLICATIONS

Fan et al., *Flexible triboelectric generator!*, Nano Energy, pp. 328-334 (Mar. 2012).

(Continued)

*Primary Examiner* — Bernard Rojas
*Assistant Examiner* — Rashad Johnson
(74) *Attorney, Agent, or Firm* — Farjami & Farjami LLP (57) ABSTRACT

There is provided a system and method for harvesting electrical energy from interaction with papers. The system comprising an electret disposed between a first electrode and a second electrode, and an interactive device connected to one end of the first electrode and one end of the second electrode to provide an electrical potential, the interactive device configured to receive the electrical potential by moving the second electrode relative to the electret for generating electrical energy. Interactive devices that can be activated by the generator can include a light-emitting diode, an electronic paper display, an infrared communication, and a buzzer.

18 Claims, 6 Drawing Sheets

(56) References Cited

U.S. PATENT DOCUMENTS

| | | | |
|---|---|---|---|
| 2011/0169257 A1* | 7/2011 | Stone | B42D 3/12 |
| | | | 281/15.1 |
| 2011/0212429 A1* | 9/2011 | Stone | B42D 3/123 |
| | | | 434/317 |
| 2011/0227448 A1* | 9/2011 | Kandori | A61B 5/0095 |
| | | | 310/300 |
| 2011/0227487 A1* | 9/2011 | Nichol | G02B 6/0018 |
| | | | 315/158 |
| 2013/0049531 A1 | 2/2013 | Wang | |
| 2013/0316321 A1* | 11/2013 | Herz | G09B 5/06 |
| | | | 434/317 |
| 2015/0022980 A1* | 1/2015 | Van Den Brink | H05K 1/028 |
| | | | 361/749 |
| 2015/0061460 A1* | 3/2015 | Bae | H02N 1/04 |
| | | | 310/310 |

OTHER PUBLICATIONS

Wang et al., *Sliding-Triboelectric Nanogenerators Based on In-Plane Charge-Separation Mechanism*, Nano Letters, pp. A-H (Mar. 2013).

Wang, Zhong Lin, *Triboelectric Nanogenerators as New Engergy Technology, for Self-Powered Systems and as Active Mechanical and Chemical Sensors*, ACS Nano Review, pp. A-Y (Sep. 2013).

Zhong et al, *A paper-based nanogenerator as a power source and active sensor*, Energy & Environmental Science, pp. 1779-1784 (Mar. 2013).

Post et al., *Electrostatic Power Harvesting in Textiles*, Proceedings of the 2010 ESA Annual Meeting on Electrostatics, pp. G1-10 (Jun. 2010).

* cited by examiner

HARVESTING ENERGY FROM INTERACTION WITH PAPERS

RELATED APPLICATIONS

The present application claims the benefit of and priority to a U.S. Provisional Patent Application Ser. No. 61/886,519, filed Oct. 3, 2013 and titled "Paper Generators-Harvesting Energy from Touching, Rubbing and Sliding," which is hereby incorporated by reference in its entirety into the present application.

BACKGROUND

Generating power from human motion requires designing devices that convert the motion of the human body into other forms of energy. The central element in any energy generation device is the generator, a device that converts one form of energy into another form of energy. Numerous generators for human power generation have been explored, such as piezo-based devices that produce power from vibration, electrostatic vibration generators, thermal converters, magnetic induction-based generators, and RF-based electrical generators. However, these devices require complex and expensive structures. Furthermore, these devices are big and bulky, and do not work well in situations where construction space is limited.

SUMMARY

The present disclosure is directed to harvesting energy from interaction with papers, such as by a user touching, rubbing and sliding a paper, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
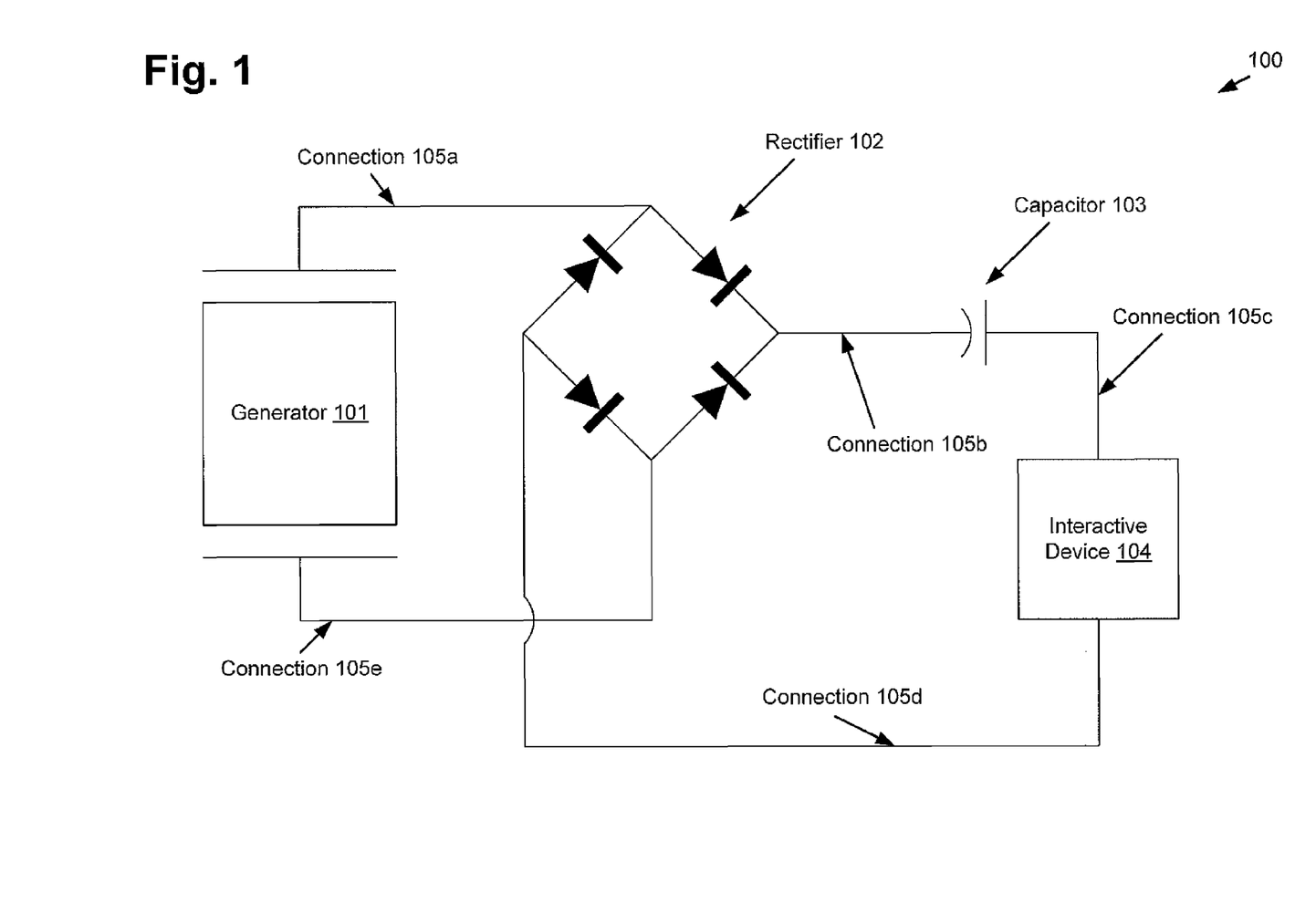
FIG. 1 presents a system for harvesting electrical energy from an interaction with papers, according to one implementation of the present disclosure.

FIG. 1 presents a system for harvesting electrical energy from an interaction with papers, according to one implementation of the present disclosure. System 100 of FIG. 1 includes generator 101, rectifier 102, capacitor 103, and interactive device 104. System 100 of FIG. 1 also includes connection 105a, connection 105b, connection 105c, connection 105d, and connection 105e, collectively referred to as connections 105a-e.

As a preliminary point, it is noted that the implementation of FIG. 1 includes one generator 101, one rectifier 102, one capacitor 103, and one interactive device 104, however, the implementation of FIG. 1 is not limiting. In other implementations, system 100 may include any number of generators, rectifiers, capacitors, and interactive devices. Furthermore, in other implementations, system 100 may not include one or both of rectifier 102 and capacitor 103.

As illustrated in FIG. 1, system 100 includes generator 101. Generator 101 is the energy harvesting unit that generates electrical energy from interactions with a user, such as by the user rubbing, touching, and sliding paper. As will be explained in greater detail below with regards to FIG. 2, generator 101 includes at least two electrodes and at least one electret. Generator 101 generates the electrical energy by utilizing movements between the electrodes and the electret. For example, as relative positions between two electrodes and an electret in generator 101 move, a distribution of induced charges, an electric field, and a total capacitance between the electrodes and electret change, which results in an electric potential difference between the electrodes. This generates electrical energy that can then do work on a device, such as interactive device 104.

As illustrated in FIG. 1, system 100 also includes rectifier 102 and capacitor 103. Rectifier 102 includes any electrical device capable of converting alternating current (AC) into direct current (DC). For example, in one implementation, rectifier 102 may include a high-voltage bridge rectifier chip that converts AC voltage spikes from generator 101 into DC signals to activate interactive device 104. Capacitor 103 includes any electrical component that can store electrical energy, and release the stoned electrical energy after a target amount of electrical energy has been reached. For example, capacitor 103 may store electrical energy generated from generator 101 and once a target amount of electrical energy has been reached, capacitor 103 then releases the electrical energy to activate interactive device 104.

Also illustrated in FIG. 1, system 100 includes interactive device 104. Interactive device 104 includes any device that is capable of being activated with electrical energy. For example, interactive device 104 can include at least one of an electronic paper, a light-emitting diode (LED), an infra-red (IR) communication device, a motion device, and a sound device. In such an example, electronic paper includes paper that will produce an image when electronic energy is applied. LED includes a light that will shine with the application of electronic energy. An IR communication device includes a device that will send out an IR communication to a separate electronic device when electrical energy is applied, thus, causing the separate electronic device to perform a task, such as producing images. A motion device includes a machine that will move with the application of electrical energy. Finally, a sound device includes a machine that will make sounds with the application of electrical energy, such as a buzzer.

It is noted that electrical energy generated by generator 101 may be regulated differently depending on the type of interactive device 104 utilized in system 100. For example, two types of systems may be utilized when regulating electrical energy, an immediate use system and a store-and-release system. In an immediate use system, electrical energy produced by generator 101 is first regulated by rectifier 102 and then immediately applied to interactive device 104. As such, in immediate use systems, a capacitor is not necessary since no electrical energy needs to be stored. Immediate use systems may thus be used when interactive device 104 does not require much electrical energy to activate.

In store-and-release systems, electrical energy generated by generator 101 is used to charge capacitor 103, and is only released from capacitor 103 when a target amount of electrical energy is reached. As such, store-and-release systems are able to activate interactive devices that require a larger amount of energy. For example, the store-and-release system may be utilized for IR communication devices.

Also illustrated in FIG. 1, system 100 includes connections 105a-e. Connections 105a-e include any material capable of carrying the electrical energy generated by generator 101. For example, connections 105a-e may include electrical wires that are connected to the electrodes of generator 101, rectifier 102, capacitor 103, and interactive device 104. Connections 105a-e may be connected to the different devices using conductive bonding materials (not shown). For example, connection 105a may be connected to a first electrode of generator 101 and connection 105e may be connected to a second electrode of generator 101 using silver-based conductive epoxies or copper tape.

In the implementation of FIG. 1, generator 101 is connected to interactive device 104 using connections 105a-e, which provides an electric potential for interactive device 104. To activate interactive device 104, generator 101 generates electrical energy in the form of AC voltage. The AC voltage then travels through connection 105a to rectifier 102, where rectifier 102 converts the AC voltage into DC signals. The electrical energy then travels as DC through connection 105b to capacitor 103. Capacitor 103 stores the electrical energy until a target amount of electrical energy has been reached, at which point capacitor 103 releases the electrical energy to interactive device 104 through connection 105c. The electrical energy activates interactive device 104 and then travels back to generator 101 through connection 105d and connection 105e.

Figure 2:
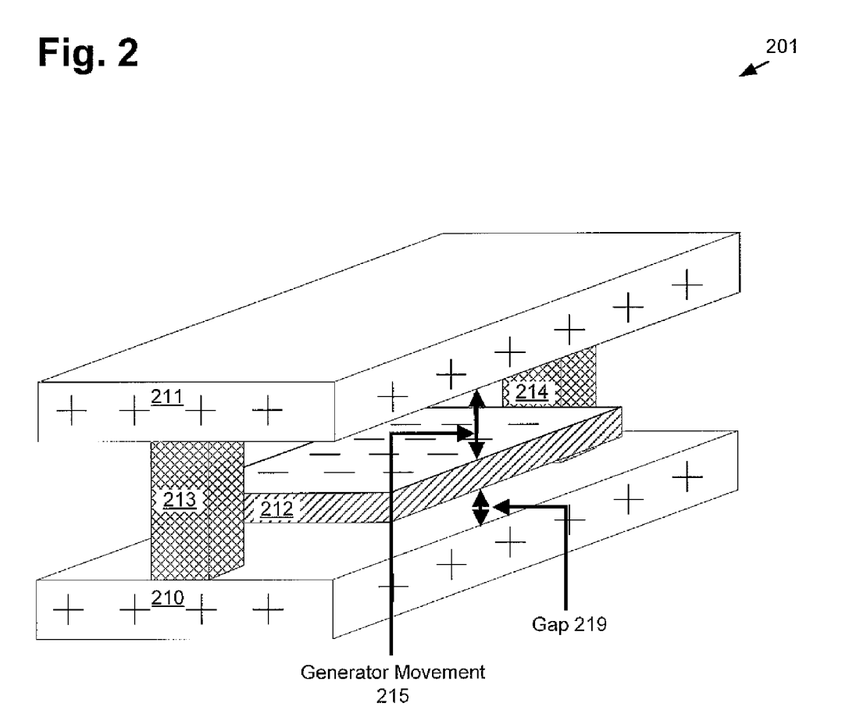
FIG. 2 presents a generator that harvests electrical energy from interaction with papers, according to one implementation of the present disclosure.

FIG. 2 presents a generator that harvests electrical energy from interaction with papers, according to one implementation of the present disclosure. Generator 201 of FIG. 2 includes electrode 210, electrode 211, electret 212, support 213, and support 214. Also, illustrated in FIG. 2 is generator movement 215 and gap 219. With regards to FIG. 2, it should be noted that generator 201 corresponds to generator 101 from FIG. 1.

As illustrated in FIG. 2, generator 201 includes two separate electrodes, electrode 210 and electrode 211. Electrode 210 and electrode 211 can include any material that is conductive. For example, each of electrode 210 and electrode 211 can include silver-coated polyester, aluminum, or paper with printed conductive inks or paints. For another example, each of electrode 210 and electrode 211 can include a hand of a user.

In the illustration of FIG. 2, generator 201 includes electrode 210 on a bottom surface and electrode 211 on a top surface. However, the implementation of FIG. 2 is not limiting and in other implementations generator 201 can include any number of electrodes in any number of positions. For example, in another implementation, generator 201 might include only electrode 210, with electrode 211 being separate from generator 201. Still in other implementations, generator 201 may include three or more electrodes.

Also illustrated in FIG. 2 is electret 212. Electret 212 is the electrically active material of generator 201 and as such, electret 212 includes a material with a low electron affinity. By utilizing a material with a lower electron affinity for electret 212, the negative charge on electret 212 can be greatly increase and thus, the amount of electrical energy produced by generator 201 is also increased. For example, in one implementation, electret 212 may include a flexible sheet of polytetrafluoroethylene sold under the trademark TEFLON®. The TEFLON® can then be rubbed against the surface of another material with a higher electron affinity, such as paper, and due to the triboelectric effect between the TEFLON® and the paper, a charge on the TEFLON® will become negative. This negative charge on the TEFLON®, as illustrated in FIG. 2, then causes the TEFLON® to become an electric field source for generator 201.

Also illustrated in FIG. 2 are support 213 and support 214. As illustrated in the implementation of FIG. 2, support 213 and support 214 are used to create a gap between electrode 211 and electret 212. As will be explained in more detail below, generator 201 generates electrical energy by moving electrode 211 with respect to electrode 210 and electret 211. For example, and as illustrated in FIG. 2, a user of generator 201 is able to press down on electrode 211 to create generator movement 215 to generate electrical energy. Support 213 and support 214 are thus used to maintain the gap between electrode 211 and electret 212 each time the uses releases electrode 211.

In the implementation of FIG. 2, electret 212 is disposed above electrode 210, and electrode 211 is disposed above electret 212. As discussed above, and as illustrated in FIG. 2, electret 212 includes a material with a low electron affinity, which gives electret 212 a negative charge when rubbed up against other materials. Each of electrode 210 and electrode 211 would thus contain a positive charge to counter the negative charge on electret 212. Furthermore, each of electrode 210 and electrode 211 may be connected to an electrical load, such as interactive device 104 from FIG. 1 using connections 105a-e, to create a system with an electrical potential.

As illustrated in FIG. 2, gap 219 is illustrated as separating electret 212 from electrode 210 and as such, electret 212 is not connected to electrode 210 in the implementation of FIG. 2. By having electret 212 separate from both electrode 210 and electrode 211, electret 212 can be easily removed from generator 201 and replaced as needed. Furthermore, constructing generator 201 can more easily be accomplished since it does not require attaching electret 212 to either electrode 210 or electrode 211, thus, requiring less materials. However, it is noted that in other implementations, electret 212 may be attached to either electrode 210 or electrode 211.

Generator 201 of FIG. 2 works by moving electrode 211 with respect to electret 212 and electrode 210. For example, and as illustrated in FIG. 2, a user of generator 201 can push the top of electrode 211 towards both electret 212 and electrode 210, as generator movement 215. As electrode 211 gets closer to electret 212, induced charges on the electrodes can transfer from one electrode to the other electrode through an interactive device, such as interactive device 104 from FIG. 1. For example, as generator movement 215 decreases, meaning that a user is pushing electrode 211 closer to electret 212, electrical energy is generated and a current flows from electrode 210 to electrode 211 through the interactive device. For another example, as generator movement 215 increases, meaning that a user has released electrode 211 and support 213 and support 214 are causing electrode 211 to move back to its original position, electrical energy is generated and a current flows from electrode 211 to electrode 210 through the interactive device. This current flowing through the interactive device does the electrical work needed to activate the interactive device.

FIGS. 3A-F present example implementations of various generator systems that can harvest electrical energy through interactions with paper. The generators of FIGS. 3A-F may be included in, but are not limited to, books, posters, magazines, and clothing. As such, in the implementations of FIGS. 3A-F, the generators are installed on substrates. The substrates include any type of material that generators can be utilized on. For example, the substrates might include the paper of books, posters, and magazines. Furthermore, as a preliminary note for FIGS. 3A-3F, dotted lines indicate that the component is behind another component in the Figure. For example, in FIG. 3A, electrode 310a is behind electret 312a, and electrode 311a is behind substrate 317a.

It should be noted that with respect to FIGS. 3A-F, each generator system includes a series of electrodes and an electret. In a preferred implementation for each of FIGS. 3A-F, the electrodes may include printed conductive inks, such as silver based conductive ink. By using printed conductive inks for the electrodes of the generator system, constructing each generator system can be done quickly and in a cost effective way. Furthermore, it is easier to customize a generator system for the type of use the generator system is intended for. For example, if a generator system is intended to be used in a book, constructing the electrodes of the generator system would only include printing the conductive ink onto the paper of the book.

Figure 3A:
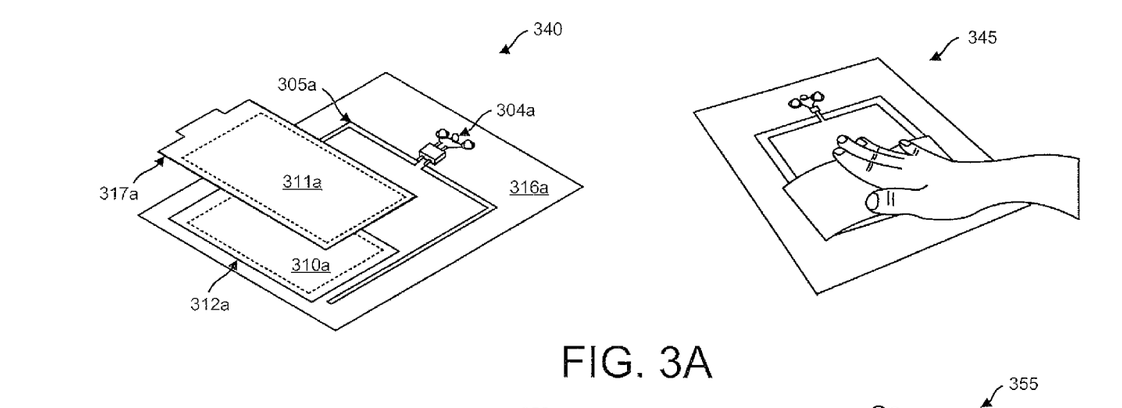
FIG. 3A presents an example of a tapping generator, according to one implementation of the present disclosure.

FIG. 3A presents an example of a tapping generator, according to one implementation of the present disclosure. FIG. 3A includes tapping system 340 and tapping movement 345. Tapping system 340 includes interactive device 304a, connections 305a, electrode 310a, electrode 311a, electret 312a, substrate 316a, and substrate 317a. With regards to FIG. 3A, it should be noted that interactive device 304a and connections 305a correspond respectively to interactive device 104 and connections 105a-e from FIG. 1. It should further be noted that electrode 310a, electrode 311a, and electret 312a from FIG. 3A correspond respectively to electrode 210, electrode 211, and electret 212 from FIG. 2.

As illustrated in FIG. 3A, the generator of tapping system 340 includes electrode 310a, electrode 311a, and electret 312a. In the implementation of FIG. 3A, the generator is assembled to include electrode 310a disposed above substrate 316a, and electret 312a disposed above electrode 310a. The generator is further assembled to include electrode 311a disposed above electret 312a, and substrate disposed above electrode 311a. Finally, the generator is connected to interactive device 304a using connections 305a, where connections 305a connect each of electrode 310a and electrode 311a to interactive device 304a.

As illustrated in the implementation of FIG. 3A, tapping movement 345 shows a user utilizing tapping system 340 to activate an interactive device. To activate interactive device 304a of tapping system 340, the user places his or her hand on the top of substrate 317a and presses down. This movement of pressing down on substrate 317a causes electrode 311a to come into contact with, or close to, electret 312a. As discussed above, relative movement between electrode 310a, electrode 311a, and electret 312a will generate electrical energy that can be used to activate interactive device 304a.

Figure 3B:
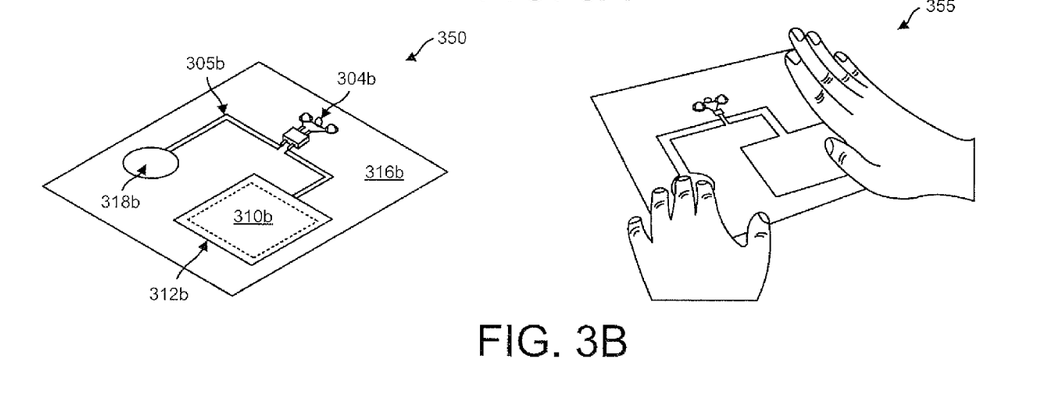
FIG. 3B presents an example of a touching generator, according to one implementation of the present disclosure.

FIG. 3B presents an example of a touching generator, according to one implementation of the present disclosure. FIG. 3B includes touching system 350 and touching movement 355. Touching system 350 includes interactive device 304b, connections 305b, electrode 310b, electret 312b, substrate 316b, and electrode pad 318b. With regards to FIG. 3B, it should be noted that interactive device 304b and connections 305b correspond respectively to interactive device 104 and connections 105a-e from FIG. 1. It should further be noted that electrode 310b and electret 312b from FIG. 3B correspond respectively to electrode 210 and electret 212 from FIG. 2.

As illustrated in FIG. 3B, the generator of touching system 350 includes electrode 310b and electret 312b, but does not include a second electrode as in tapping system 340 of FIG. 3A. Instead, touching system 350 includes electrode pad 318b. Electrode pad 318b is the designated pad of touching system 350 that is used to close the circuit in order to generate electrical energy, which is done by a user of touching system 350 connecting an electrode from electrode pad 318b to electret 312b. For example, as illustrated in FIG. 3B, electrode 310b is disposed on substrate 316b, electret 312b is disposed on electrode 310b, electrode pad 318b is disposed on substrate 316b, and interactive device is connected to both electrode 310b and electrode pad 318b using connections 305b. A user can then use his or her hand as the second electrode by placing one hand on electrode pad 318b and placing a second hand on electret 312b. As the user touches both electrode pad 318b and electret 312b, the generator of touching system 350 will generate electrical energy just like the generator of tapping system 340.

As illustrated in the implementation of FIG. 3B, touching movement 355 shows the user activating interactive device 304b of touching system 350. To activate interactive device 304b of touching system 350, as explained above, the user first places his or her left hand on electrode pad 318b and then places his or her right hand on electret 312b. This movement closes the circuit of touching system 350 and creates movement between electrode 310b, electret 312b, and the hand of the user, which in touching system 350 is the second electrode. As discussed above, relative movement between electrode 310b, electret 312b, and a second electrode will generate electrical energy that can be used to activate interactive device 304b.

Figure 3C:
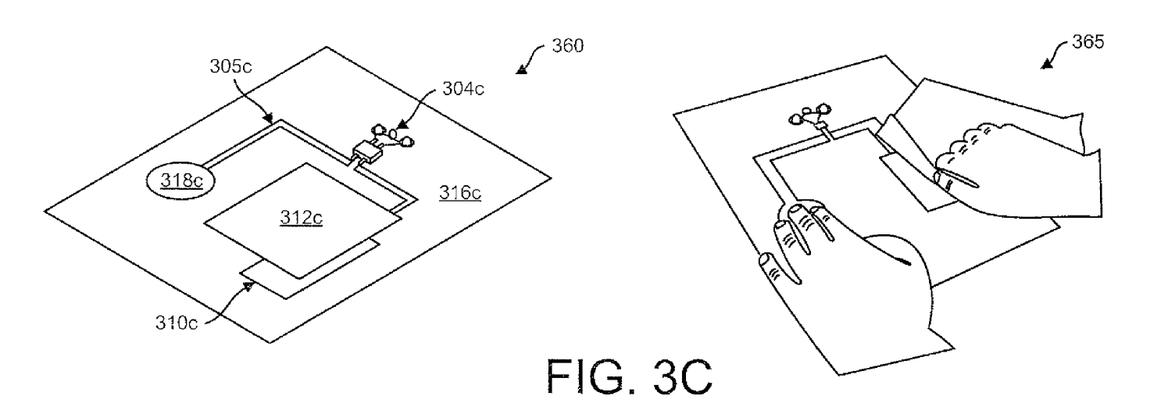
FIG. 3C presents an example of a rubbing generator, according to one implementation of the present disclosure.

FIG. 3C presents an example of a rubbing generator, according to one implementation of the present disclosure. FIG. 3 includes rubbing system 360 and rubbing movement 365. Rubbing system 360 includes interactive device 304c, connections 305c, electrode 310c, electret 312c, substrate 316c, and electrode pad 318c. With regards to FIG. 3C, it should be noted that interactive device 304c and connections 305c correspond respectively to interactive device 104 and connections 105a-e from FIG. 1. It should further be noted that electrode 310c and electret 312c from FIG. 3C correspond respectively to electrode 210 and electret 212 from FIG. 2.

As illustrated in FIG. 3C, the generator of rubbing system 360 includes electrode 310c and electret 312c, but does not include a second electrode. Instead, like with touching system 350 of FIG. 3B, rubbing system 350 includes electrode pad 318c. Electrode pad 318c is the designated pad of rubbing system 360 that the user uses to close the circuit to activate the generator by connecting an electrode from electrode pad 318c to electret 312c. For example, a user of rubbing system 360 may use his or her hand as the second electrode by touching electret 312c.

As further illustrated in FIG. 3C, electrode 310c is disposed on substrate 316c, but electret 312c is separated from electrode 310c. As such, in rubbing system 360, to generate electrical energy, a user of rubbing system 360 must hold electret 312c in his or her hand and rub electret 312c on electrode 310c. For example, and as illustrated by rubbing movement 365, to generate electrical energy using the generator of rubbing system 360, a user places his or her first hand on electrode pad 318c and uses his or her second hand to rub electret 312c on electrode 310c. As discussed above, movement between electrode 310c, electret 312c, and the hand of the user, which is the second electrode in rubbing system 360, generates electrical energy. This generated electrical energy will then activate interactive device 304c by utilizing connections 305c.

It should be noted that in a preferred implementation of FIG. 3C, each of electrode 310c and electrode 311c may be coated with an insulator. For example, in one implementation, each of electrode 310c and electrode 311c may be coated with a dielectric material.

Figure 3D:
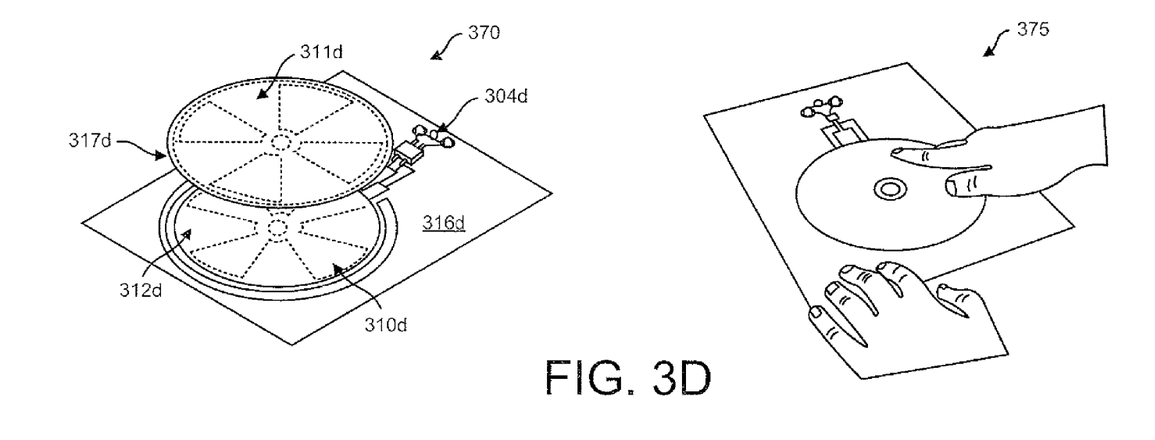
FIG. 3D presents an example of a rotating generator, according to one implementation of the present disclosure.

FIG. 3D presents an example of a rotating generator, according to one implementation of the present disclosure. FIG. 3D includes rotating system 370 and rotating movement 375. Rotating system 370 includes interactive device 304d, electrode 310d, electrode 311d, electret 312d, substrate 316d, and substrate 317d. With regards to FIG. 3D, it should be noted that interactive device 304d corresponds to interactive device 104 from FIG. 1. It should further be noted that electrode 310d, electrode 311d, and electret 312d from FIG. 3D correspond respectively to electrode 210, electrode 211, and electret 212 from FIG. 2.

As illustrated in FIG. 3D, the generator of rotating system 370 includes electrode 310d, electrode 311d, and electret 312d. In the implementation of FIG. 3D, the power generator is assembled to include electrode 310d disposed over substrate 316d, and electret 312d disposed over electrode 310d. The power generator is further assembled to include electrode 311d disposed over electret 312d, and substrate 317d disposed over electrode 311d. Finally, the power generator is connected to interactive device 304d using connections, such as connections 105a-e from FIG. 1.

In rotating system 370, both electrode 310d and electrode 311d are designed with at least one extension arm that extends from a center point. As illustrated in FIG. 3A, each of electrode 310d and electrode 311d includes four extending arms. Electrodes of rotating system 370 are designed with rotating arms because, as shown by rotating movement 375, a user of rotating system rotates electrode 311d. Movement between electrode 310d, electrode 311d, and electret 312d is thus made by the arms of the electrodes rotating with respect to each other. As discussed above, movement between electrode 310d, electrode 311d, and electret 312d generates electrical energy. This generated electrical energy will then activate interactive device 304d through the electrical connections.

Figure 3E:
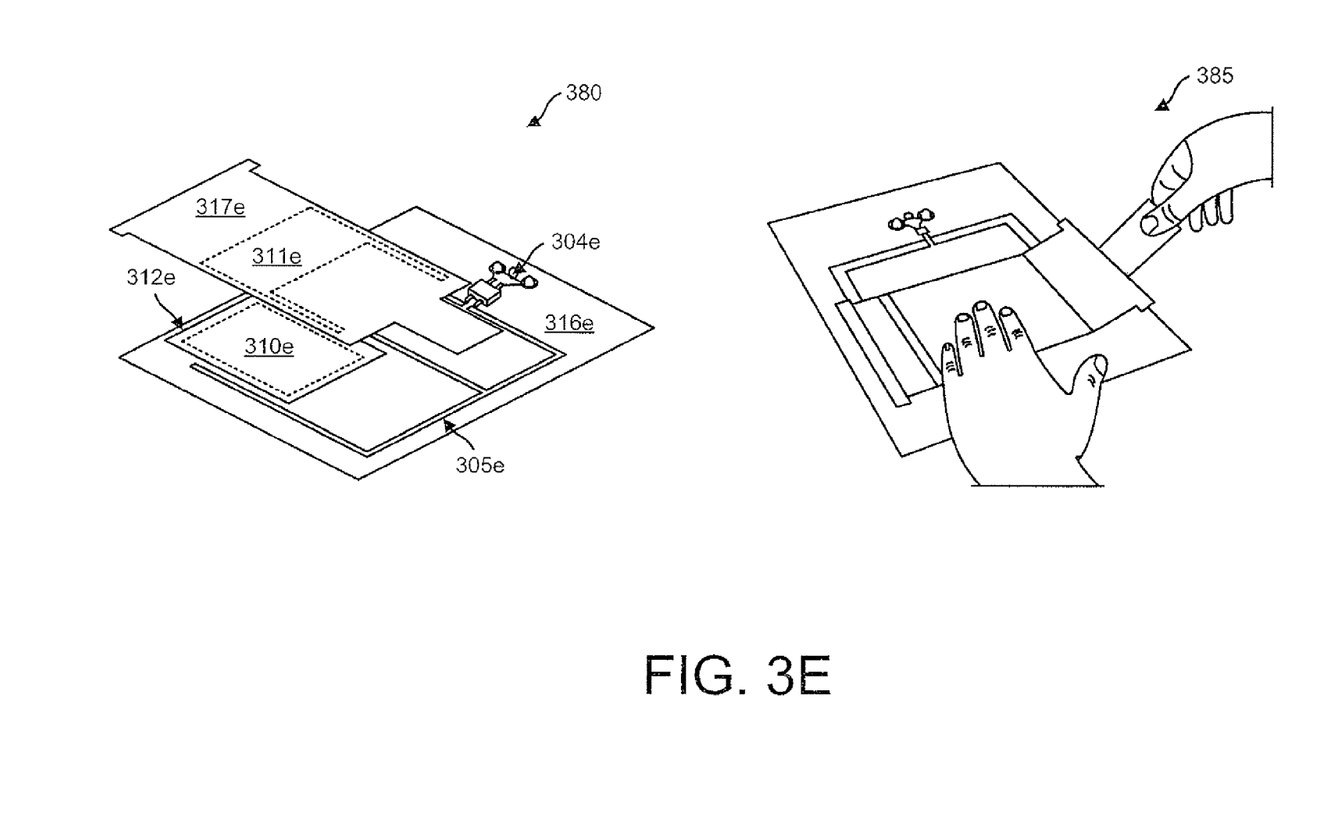
FIG. 3E presents an example of a sliding generator, according to one implementation of the present disclosure.

FIG. 3E presents an example of a sliding generator, according to one implementation of the present disclosure. FIG. 3E includes sliding system 380 and sliding movement 385. Sliding system 380 includes interactive device 304e, connections 305e, electrode 310e, electrode 311e, electret 312e, substrate 316e, and substrate 317e. With regards to FIG. 3E, it should be noted that interactive device 304e and connections 305e correspond respectively to interactive device 104 and connections 105a-e from FIG. 1. It should further be noted that electrode 310e, electrode 311e, and electret 312e from FIG. 3E correspond respectively to electrode 210, electrode 211, and electret 212 from FIG. 2.

As illustrated in FIG. 3E, the generator of sliding system 380 includes electrode 310e, electrode 311e, and electret 312e. In the implementation of FIG. 3E, the generator is assembled to include electrode 310e disposed over substrate 316e, and electret 312e disposed over electrode 310e. The power generator is further assembled to include electrode 311e attached to a bottom side of substrate 317e. Finally, the power generator is connected to interactive device 304e using connections 305e.

In the implementation of FIG. 3E, in sliding system 380, electrode 311e is separated from both electrode 310e and electret 312e, as electrode 311e is a separate device. As such, and as illustrated by sliding movement 385, a user of sliding system 380 uses his or her hand to slide electrode 311e over electret 312e to create movement. For example, as illustrated by sliding movement 385, to create movement between electrode 310e, electrode 311e, and electret 312e, a user may use his or her first hand to press down on substrate 317e so that electrode 311e is in contact with electret 312e, and use his or her second hand to pull substrate 317e so that electrode 311e slides on electret 312e. As discussed above, movement between electrode 310e, electrode 311e, and electret 312e generates electrical energy. This generated electrical energy will then activate interactive device 304e by utilizing connections 305e.

Figure 4:
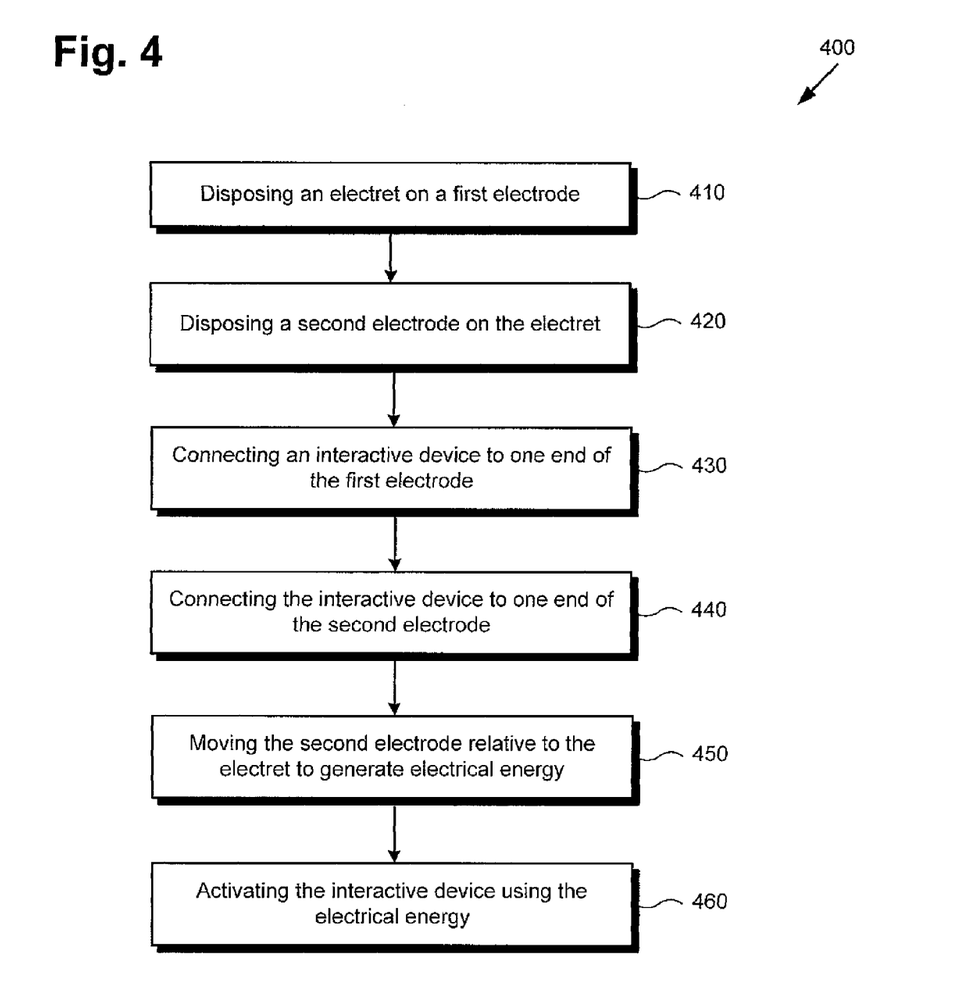
FIG. 4 shows a flowchart illustrating a method for harvesting electrical energy from an interaction with papers, according to one implementation of the present disclosure.

FIG. 4 shows a flowchart illustrating a method for harvesting electrical energy from an interaction with papers, according to one implementation of the present disclosure. The approach and technique indicated by flowchart 400 are sufficient to describe at least one implementation of the present disclosure, however, other implementations of the disclosure may utilize approaches and techniques different from those shown in flowchart 400. Furthermore, while flowchart 400 is described with respect to FIGS. 1 and 2, the disclosed inventive concepts are not intended to be limited by specific features shown and described with respect to FIGS. 1 and 2. Furthermore, with respect to the method illustrated in FIG. 4, it is noted that certain details and features have been left out of flowchart 400 in order not to obscure the discussion of inventive features in the present application.

Flowchart 400 of FIG. 4 includes disposing an electret on a first electrode (410). For example, electret 212 may be disposed on electrode 210. As discussed above, electrode 212 may include any material that is conductive, such as silver-coated polyester. Electret 212 is the electrically active material and may include TEFLON®.

Flowchart 400 also includes disposing a second electrode on the electret (420). For example, electrode 211 may be disposed on electret 212. Furthermore, as illustrated in FIG. 2, support 213 and support 214 may be used when disposing electrode 211 on electret 212 so that there is a gap between electrode 211 and electret 212.

Flowchart 400 also includes connecting an interactive device to one end of the first electrode (430) and connecting the interactive device to one end of the second electrode (440). For example, interactive device 104 may be connected to generator 101/201. As discussed above, generator 101/201 may include two electrodes, electrode 210 and electrode 211. Interactive device 104 may thus be connected to electrode 210 and electrode 211 using connections 105a-e. By connecting interactive device 104 to the electrodes of generator 101/201, an electrical potential is provided that can activate interactive device 104.

Flowchart 400 also includes moving the second electrode relative to the electret to generate electrical energy (450). For example, a user of generator 101/201 may move electrode 211 relative to electret 212 to create generator movement 215. As illustrated in FIGS. 3A-F, moving electrode 211 may include tapping, touching, rubbing, rotating, and sliding electrode 211 with respect to electret 212. By moving electrode 211 with respect to electrode 210 and electret 212, generator 101/201 generates electrical energy.

Flowchart 400 also includes activating the interactive device using the electrical energy (460). For example, the electrical energy generated by generator 101/201 may be used to activate interactive device 104. As discussed above, there are two types of systems that may be utilized in order to activate interactive device 104 with electrical energy. In the immediate use system, electrical energy produced by generator 101/201 is first regulated by rectifier 102 and then immediately applied to interactive device 104. In the store-and-release system, electrical energy generated by generator 101/201 is used to charge capacitor 103, and is only released from capacitor 103 to activate interactive device 104 when a target amount of electrical energy is reached.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A paper book comprising:
   a plurality of papers including a first paper;
   a first electrode having a first conductive ink on the first paper;
   a second electrode having a second conductive ink on the first paper;
   an electret disposed between the first electrode and the second electrode;
   a rectifier connected to at a first end to the first electrode and at a second end to the second electrode; and
   an infrared (IR) communication device attached to the paper book and connected at one end to a third end of the rectifier and at another end to a fourth end of the rectifier, the IR communication device configured to receive a direct current (DC) from the rectifier caused by moving the second electrode relative to the electret to generate an alternating current (AC) provided to the rectifier, the IR communication device configured to transmit an IR signal to a separate device, in response to receiving the DC, causing the separate device to produce images.

2. The paper book of claim 1, wherein the electret includes polytetrafluoroethylene and the first electrode and the second electrode include silver-coated polyester.

3. The paper book of claim 1, further comprising supports, wherein the first electrode is connected to the second electrode using the supports.

4. The paper book of claim 1, wherein the moving of the second electrode relative to the electret includes tapping the second electrode.

5. The paper book of claim 1, wherein the moving of the second electrode relative to the electret includes rotating the second electrode on the electret.

6. The paper book of claim 1, wherein the moving of the second electrode relative to the electret includes sliding the second electrode on the electret.

7. The paper book of claim 1, wherein the paper book further includes at least one of a light-emitting diode (LED), an electronic paper display and a buzzer receiving the DC.

8. The paper book of claim 1, further comprising a capacitor disposed between the rectifier and the infrared (IR) communication device.

9. The paper book claim 1, wherein the electret is separate from both the first electrode and the second electrode so that the electret can be removed and replaced by another electret.

10. A method of creating a paper book, the method comprising:
   providing a plurality of papers including a first paper;
   printing a first conductive ink on the first paper to provide a first electrode;
   printing a second conductive ink on the first paper to provide a second electrode;
   disposing an electret disposed between the first electrode and the second electrode;
   disposing a rectifier between the first electrode and the second electrode connected to at a first end to the first electrode and at a second end to the second electrode; and
   attaching an infrared (IR) communication device to the paper book, wherein the IR communication device is connected at one end to a third end of the rectifier and at another end to a fourth end of the rectifier, the IR communication device configured to receive a direct current (DC) from the rectifier caused by moving the second electrode relative to the electret to generate an alternating current (AC) provided to the rectifier, the IR communication device configured to transmit an IR signal to a separate device, in response to receiving the DC, causing the separate device to produce images.

11. The method of claim 10, wherein the electret includes polytetrafluoroethylene and the first electrode and the second electrode include silver-coated polyester.

12. The method of claim 10, further comprising:
   providing supports, wherein the first electrode is connected to the second electrode using the supports.

13. The method of claim 10, wherein the moving of the second electrode relative to the electret includes tapping the second electrode.

14. The method of claim 10, wherein the moving of the second electrode relative to the electret includes rotating the second electrode on the electret.

15. The method of claim 10, wherein the moving of the second electrode relative to the electret includes sliding the second electrode on the electret.

16. The method of claim 10, wherein the paper book further includes at least one of a light-emitting diode (LED), an electronic paper display and a buzzer receiving the DC.

17. The method of claim 10, further comprising:
   disposing a capacitor between the rectifier and the IR communication device.

18. The method of claim 10, wherein the electret is separate from both the first electrode and the second electrode so that the electret can be removed and replaced by another electret.

* * * * *